United States Patent [19]

Katsimbas

[11] E Re. 29,028

[45] Reissued Nov. 2, 1976

[54] HEAT-CURABLE PULVERULENT COATING AGENT CONSISTING OF A MIXTURE OF COPOLYMERS CONTAINING GLYCIDYL GROUPS, DICARBOXYLIC ACID ANHYDRIDES AND CURING ANHYDRIDES

[75] Inventor: Themistoklis Katsimbas, Hamburg, Germany

[73] Assignee: Hoechst Aktiengesellschaft, Germany

[22] Filed: Jan. 21, 1976

[21] Appl. No.: 651,164

Related U.S. Patent Documents

Reissue of:

[64] Patent No.: 3,919,347
Issued: Nov. 11, 1975
Appl. No.: 474,529
Filed: May 30, 1974

[30] Foreign Application Priority Data

June 26, 1973 Switzerland ..... 9314/73

[52] U.S. Cl. ..... 260/836; 260/827; 260/830 R; 260/830 TW; 260/835; 260/837 R; 427/185

[51] Int. Cl.[2] ..... C08L 63/00

[58] Field of Search ..... 260/836

[56] References Cited

UNITED STATES PATENTS

| | | | |
|---|---|---|---|
| 3,541,055 | 11/1970 | Malamet | 260/78.4 EP |
| 3,730,930 | 5/1973 | Labana | 260/836 |
| 3,752,870 | 8/1973 | Labana | 260/830 R |
| 3,758,632 | 9/1973 | Labana | 260/830 R |
| 3,770,848 | 11/1973 | Labana | 260/836 |
| 3,781,379 | 12/1973 | Theodore | 260/836 |
| 3,781,380 | 12/1973 | Labana | 260/836 |
| 3,787,521 | 1/1974 | Labana | 260/836 |

*Primary Examiner*—Paul Lieberman
*Attorney, Agent, or Firm*—Gordon W. Hueschen

[57] ABSTRACT

The invention relates to heat-curable pulverulent coating agents, frequently also called powder lacquers, which are suitable for applying a coherent coating which possesses excellent properties after heat-curing.

6 Claims, No Drawings

HEAT-CURABLE PULVERULENT COATING AGENT CONSISTING OF A MIXTURE OF COPOLYMERS CONTAINING GLYCIDYL GROUPS, DICARBOXYLIC ACID ANHYDRIDES AND CURING ANHYDRIDES

Matter enclosed in heavy brackets [ ] appears in the original patent but forms no part of this reissue specification; matter printed in italics indicates the additions made by reissue.

BACKGROUND OF THE INVENTION

It is already known to manufacture heat-curable pulverulent coating agents based on copolymers which contain glycidyl groups, and to use such coating agents. However, such known products suffer from the disadvantage that they must be stoved at temperatures above 200° in order to obtain resistant films. If attempts are made to lower the stoving temperatures of such known pulverulent coating agents by addition of accelerators, the effect is inadequate or the resulting films yellow already during the stoving process, and at times the adhesion is also interfered with.

Such known pulverulent coating agents are described in German Offenlegungsschriften No. 2,240,312, 2,240,314, 2,240,315, 2,057,577, 2,064,916, 2,214,650 and 2,122,313.

1. It is the task of the present invention to provide a heat-curable pulverulent coating agent which shows simultaneous improvements in various directions compared to the known pulverulent coating agents. One objective is that it should be possible to manufacture the pulverulent coating agent by simple mixing, homogenising fusion and conjoint grinding of the requisite components.

2. The pulverulent coating agent manufactured by thorough mixing, homogenising fusion and grinding should be storage-stable at the customary storage temperatures between about −40 and +40° C.

3. The coating agent should, after application, give very glossy, non-yellowing coatings of good levelling characteristics and freedom from blisters and craters, merely by stoving for about 15 to 30 minutes at about 150° to 180° C.

4. The stoved films should not yellow and should not only exhibit excellent weathering resistance but also substantially improved resistance to organic solvents and chemicals, the comparison of these properties being with powder lacquers which are formulated on the basis of acrylate copolymers.

SUMMARY

The subject of the invention is a pulverulent coating agent of a mixture of

A. a copolymer of relatively low molecular weight, which contains glycidyl groups and is a copolymer of several ethylenically unsaturated compounds, B. at least one dicarboxylic acid anhydride in an amount corresponding to 0.4–1.0 anhydride groups per epoxy group (glycidyl groups) of the copolymer and C. a curing accelerator in the form of an organic base, D. a flow control agent in an amount of at least 0.05 per cent by weight of the mixture, which agent is a polymer of molecular weight ($M_n$) of at least 1,000 and has a glass transition temperature which is at least 50° C lower than the glass transition temperature of the copolymer (A), characterised in that the component (A) consists of 84 to 94 per cent by weight of copolymers containing epoxide groups and hydroxyl groups, which copolymers have Durran softening points of about 90°–120° C and are soluble in organic solvents and comprise:

a. 6–24 per cent by weight of ethylenically unsaturated epoxide monomers with 6–12 carbon atoms, of the general formula

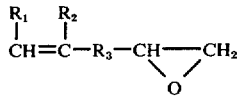

wherein $R_1$ and $R_2$ =H— or —$CH_3$ $R_3$ = $-\underset{\underset{O}{\|}}{C}-O-CH_2-$ or $-CH_2-O-CH_2-$ or $-CH_2-O-\underset{\underset{O}{\|}}{C}-CH=CH-\underset{\underset{O}{\|}}{C}-O-CH_2-$ or

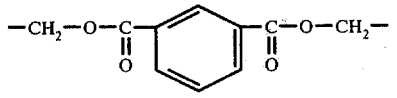

or zero b. 4–20 per cent by weight of hydroxyalkyl esters of acrylic acid or methacrylic acid, with the hydroxyalkyl ester group being saturated and containing 2–4 C atoms, c. 25–50 per cent by weight of methyl methacrylate and d. 25–45 per cent by weight of other acrylic acid esters or methacrylic acid esters of aliphatic saturated monoalcohols with 1 to 8 carbon atoms, the component (B) consisting of 6–16 per cent by weight of at least one dicarboxylic acid anhydride with melting points of about 60°–140° C, the component (C) consisting of 0.5–1.8 per cent by weight of N′,N′-bis-(dimethylaminoisobutylidene)-melamine and the optional component (D) consisting of a flow control agent and other customary additives.

A preferred embodiment of the invention comprises:

a. 12 to 16 per cent by weight of glycidyl methacrylate, b. 14 to 18 per cent by weight of hydroxyethyl methacrylate, c. 34 to 44 per cent by weight of methyl methacrylate and d. 25 to 35 per cent by weight of ethyl acrylate.

A special embodiment of the present invention relates to a pulverulent coating agent according to claim 1, characterised in that component (A) consists of a copolymer formed of:

a. 12 to 16 per cent by weight of glycidyl methacrylate, b. 14 to 18 per cent by weight of hydroxyethyl methacrylate, c. 34 to 44 per cent by weight of methyl methacrylate and d. 30 to 40 per cent by weight of butyl methacrylate.

A special embodiment of the present invention relates to the use of the pulverulent coating agent according to one of the claims 1 to 6 as powder lacquer being storage stable between −40° C and +40° C and which gives highly glossy and not yellowing coatings having no blisters and no craters after stoving of the coatings at 150° C to 180° C for about 15 to 30 minutes.

As component (a) it is possible to use ethylenically unsaturated epoxy monomers with 6–12 carbon atoms, of the general formula

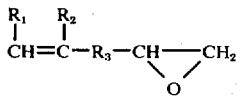

wherein $R_1$ and $R_2$ = H— or —$CH_3$ $R_3$ = $-\underset{\underset{O}{\|}}{C}-O-CH_2-$ or $-CH_2-O-CH_2-$ or $-CH_2-O-\underset{\underset{O}{\|}}{C}-CH=CH-\underset{\underset{O}{\|}}{C}-O-CH_2-$ or

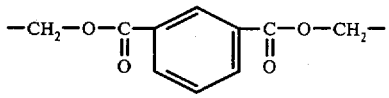

or zero

These include: glycidyl acrylate, glycidyl methacrylate, allyl glycidyl ether, methallyl glycidyl ether, glycidyl crotonate, vinyl glycidyl ether, allyl glycidyl maleate, allyl glycidyl phthalate and butadiene monoxide.

As component (b) it is possible to use hydroxyalkyl esters of acrylic acid or methacrylic acid, such as hydroxyethyl acrylate, hydroxyethyl methacrylate, hydroxypropyl acrylate and hydroxybutyl acrylate.

As component (d) it is possible to use other acrylic acid esters or methacrylic acid esters of aliphatic saturated monoalcohols with 1–8 carbon atoms, for example methyl acrylate, ethyl acrylate, butyl acrylate, 2-ethylhexyl acrylate, 2-ethylhexyl methacrylate, isobutyl acrylate and butyl methacrylate. Ethyl acrylate or butyl methacrylate are used preferentially.

The copolymers are manufactured according to known processes of bulk polymerisation, solution polymerisation or dispersion polymerisation, preferably by solution polymerisation. Such processes are described, for example, in the book "Methoden der Organischen Chemie" (Methods of Organic Chemistry), Houben-Weyl, 4th edition, volume 14/1, pages 24 to 556 (1961).

If the polymerisation is carried out in solution, solvents such as methylene chloride, ethanol, isopropanol, n-propanol, n-butanol, iso-butanol, tert.-butanol, acetic acid methyl ester to butyl ester, acetone, methyl ethyl ketone, benzene, toluene and others can be employed.

The polymerisation is carried out at temperatures of 40° to about 120° C.

As initiators it is possible to employ, for example, percarbonates, per-esters, such as tert.-butyl perpivalate or peroctoate, benzoyl peroxide, o-methoxybenzoyl peroxide, dichlorobenzoyl peroxide or azodiisobutyrodinitrile, in amounts of 0.5 to 8% by weight based on monomers.

Further, customary molecular weight regulators, such as n-dodecylmercaptan or tert.-dodecylmercaptan, can be co-used.

The copolymer solution is freed from the solvent by distilling the latter off in vacuo, or in suitable apparatus, preferably evaporator screws, at temperatures of about 90° to 160° C, and the residue is cooled, granulated and ground. However, the product can also be isolated in accordance with other processes, say by spray drying, removal of the solvent with steam and simultaneous dispersion in water, or precipitation by means of water from a water-miscible solvent.

As dicarboxylic acid anhydrides (component B) it is possible to use phthalic anhydride, p-chlorophthalic anhydride, tetrabromophthalic anhydride, cyclohexane-1,2-dicarboxylic acid anhydride, 4-methylhexane-1,2-dicarboxylic acid anhydride, cyclopentane-1,2-dicarboxylic acid anhydride, dodecylsuccinic anhydride, succinic anhydride, maleic anhydride, methylsuccinic anhydride and polyazelaic anhydride. In general, anhydrides having a melting point in the range of 60° to 140° C are preferred.

N′,N′-bis-(Dimethylaminoisobutylidene)-melamine is used as component (C). The manufacture of this compound is described in German Offenlegungsschrift No. 1,620,178, on page 5, in Example 1. Further, this compound has been described by the same applicant, in German Offenlegungsschrift No. 1,645,190, as a curing agent for epoxide resins. According to this prior description, this curing agent is used together with epoxide compounds, in amounts of 2 to 25 per cent by weight, preferably 2 to 10 per cent by weight, relative to the amount of the epoxide compound, for the purpose of a curing agent. However, it was not known, and also not to be expected, that this known curing agent would, when used in amounts of less than 2 per cent by weight, together with dicarboxylic acid anhydrides, exert an accelerating action on the anhydride curing of the epoxide resins.

As the flow control agent (D) it is possible to use, in the pulverulent coating agent, an acrylic polymer having a glass transition temperature which is at least 50° C lower than the glass transition temperature of the copolymer used in the mixture. Preferred acrylic polymers which can be used as flow control agents are polylauryl acetate, polybutyl acrylate, poly-(2-ethylhexyl acrylate), polylauryl methacrylte and polyisodecyl methacrylate.

The flow control agent can also be a fluorinated polymer which at the stoving temperature of the powder mixture has a lower surface tension than has the copolymer used in the mixture. If a fluorinated polymer is used as the flow control agent, esters of polyethylene glycol or polypropylene glycol and fluorinated fatty acids are preferred. An example of a suitable flow control agent is an ester of polyethylene glycol, of molecular weight greater than 2,500 but no more than 20,000, and perfluorooctanoic acid. Furthermore, levelling agents such as silicones, polyesters, ketone resins, epoxide resins and cellulose derivatives can be added to the melts. It is also possible to add pigments, levelling agents and other additives customary in such coating agents.

The solvent-free, optionally pigmented components, which are brittle in the non-crosslinked state, are ground to a particle size of about 100 to 300$\mu$, fused at about 95°–110°C with good mixing or kneading, cooled, again ground, after solidification, to a particle size of 30 to 120μ, and optionally screened according to particle size.

The pulverulent coating agents to be used according to the invention are still free-flowing at temperatures of at least 30°–40° C, preferably 40° C, have flow temperatures of approx. 80° to 120° C and are stoved at temperatures above 130° C, preferably at 160° to 180° C. whereupon crosslinking occurs.

The pulverulent coating agents are applied to suitable substrates, especially metals, in accordance with known methods, for example the electrostatic powder spraying process.

The stoved films of the pulverulent coating agents used according to the invention have excellent adhesion and hardness coupled with elasticity. Furthermore, they are distinguished by high gloss, excellent weathering resistance and good resistance to wash liquors.

The powders are used for coating household utensils, metal parts used in car manufacture, metal parts which are exposed to weathering factors, such as facade panels, pipes, wire braids, equipment used in forestry and agriculture and other metal articles for interior architecture.

The examples which follow describe the manufacture of the powders and their use as electrostatically sprayable powders. The parts and percentages quoted in the examples are by weight, unless stated otherwise.

EXAMPLE 1

226 g of toluene are introduced into a 1-liter stirring pot equipped with a reflux condenser, thermometer and two dropping funnels. The toluene is brought to the reflux temperature by heating to about 112° C and two monomeric mixtures, namely (a)

120 g of ethyl acrylate,
64 g of hydroxyethyl methacrylate,
64 g of glycidyl methacrylate and
152 g of methyl methacrylate and (b)

32 g of tert.-butyl peroctoate and
40 g of toluene are simultaneously added dropwise thereto over the course of about 4 hours. The mixture is then kept under reflux for a further hour and during this time an additional 4 g of tert.-butyl peroctoate are added dropwise. The mixture is then after-polymerised for a further 2 hours under reflux at about 118°–120° C. The resulting copolymer has a Gardner-Holdt viscosity of S-T measured as a 50% strength solution in toluene at 20° C. After addition of 3.2 g of a flow control agent (Modaflow of Messrs. Monsanto Chemicals), the toluene is distilled off by heating up to 160° C and under reduced pressure at 40 mm Hg, giving a brittle clear solid resin which can readily be powdered.

300 g of the resulting solid resin are ground together with 32 g of a mixture of dicarboxylic acid anhydride and curing accelerator, consisting of 92% by weight of phthalic anhydride and 8% by weight of N′,N′-bis-(dimethylaminoisobutylidene)-melamine, and an added pigment, namely 132 g of titanium dioxide (of the rutile type) of particle size about 80–200μ. The powder mixture is then mixed for 4 minutes in an extruder at 100° C, the melt is shockchilled to room temperature and the product is ground to give particles of approx. 80μ.

The pulverulent coating is applied by means of an electro-spray gun onto degreased phosphatised galvanised steel sheets and then stoved for 30 minutes at 180° C.

Coatings having the following properties are obtained;

| | | |
|---|---|---|
| Coating thickness, μ: | 44–48 | |
| Levelling, assessed visually: | 0–1 | (0 means "very good" and 5 means "bad") |
| Folding test: | 0–1 | |
| Yellowing: | 0–1 | |
| Xylene resistance, 2 hours: | 0 | |
| Pencil hardness: | $H_4$ | |
| Erichsen deep-drawing value: | 7.2 mm | |
| Gloss by Lange's method: | 108 | |
| Grid-cut test: | 0 | |

EXAMPLE 2

The procedure followed is as in Example 1, but a copolymer is produced by using the following monomer mixture: 128 g of methyl methacrylate, 152 g of butyl methacrylate, 64 g of hydroxyethyl methacrylate and 56 g of glycidyl methacrylate. This copolymer is converted to a pulverulent coating agent in accordance with the instructions of Example 1.

The stoved coatings have similar properties to the coatings which have been produced in accordance with Example 1.

EXAMPLE 3

The procedure followed is as in Example 1 with the modification of using the following monomer mixture:

150 g of methyl methacrylate,
130 g of butyl methacrylate,
60 g of hydroxyethyl methacrylate and
60 g of glycidyl methacrylate.

This copolymer is converted to a pulverulent coating agent in accordance with the instructions of Example 1. The obtained coating agent shows good lacquer properties. The pulverulent copolymer has excellent storage stability.

EXAMPLE 4

The procedure followed is as in Example 1 with the modification of employing the following monomer mixture: 300 g of methyl methacrylate, 40 g of hydroxyethyl methacrylate and 60 g of glycidyl methacrylate. The obtained copolymer is converted to a pulverulent coating agent in accordance with instructions of Example 1. This coating agent shows good lacquer properties. The pulverulent copolymer has excellent storage stability.

What is claimed is:

1. Pulverulent coating agent of a mixture of

A. a copolymer of relatively low molecular weight, which contains glycidyl groups and is a copolymer of several ethylenically unsaturated compounds, B. at least one dicarboxylic acid anhydride in an amount corresponding to 0.4–1.0 anhydride groups per epoxy group (glycidyl group) of the copolymer and C. a curing accelerator in the form of an organic base, D. a flow control agent in an amount of at least 0.05 per cent by weight of the mixture, which agent is a polymer of molecular weight ($\overline{M}_n$) of at least 1,000 and has a glass transition temperature which is at least 50° C lower than the glass transition temperature of the copolymer (A), characterised in that the component (A) consists of 84 to 94 per cent by weight of copolymers containing epoxide groups and hydroxyl groups, which copolymers have Duran softening points of about 90°–120° C and are soluble in organic solvents and consist essentially of:

a. 6–24 per cent by weight of ethylenically unsaturated epoxide monomers with 6–12 carbon atoms, of the general formula

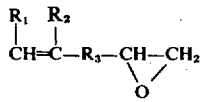

wherein $R_1$ and $R_2$ = H— or $-CH_3$ $R_3$ = $-\underset{\underset{O}{\|}}{C}-O-CH_2-$ or $-CH_2-O-CH_2-$ or $-CH_2-O-\underset{\underset{O}{\|}}{C}-CH=CH-\underset{\underset{O}{\|}}{C}-O-CH_2-$ or

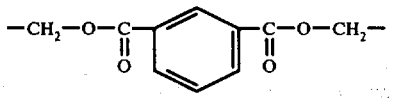

or zero, b. 4–20 per cent by weight of hydroxyalkyl esters of acrylic acid or methacrylic acid, with the hydroxyalkyl ester group being saturated and containing 2–4 C atoms, c. 25–50 per cent by weight of methyl methacrylate and d. 25–45 per cent by weight of other acrylic acid esters or methacrylic acid esters of aliphatic saturated monoalcohols with 1 to 8 carbon atoms, the component (B) consisting of 6–16 per cent by weight of at least one dicarboxylic acid anhydride with melting points of about 60°–140° C, the component (C)

[ consisting of 0.15–1.8 per cent by weight of N′,N′-bis- ] *consisting of 0.5–1.8 per cent by weight of N′,N′-bis-*(dimethylaminoisobutylidene)-melamine and the optional component (D) consisting of a flow control agent and other customary additives.

2. Pulverulent coating agent according to claim 1, characterised in that the component (A) consists of a copolymer formed of:

a. 12 to 16 per cent by weight of glycidyl methacrylate, b. 14 to 18 per cent by weight of hydroxyethyl methacrylate, c. 34 to 44 per cent by weight of methyl methacrylate and d. 25 to 35 per cent by weight of ethyl acrylate.

3. Pulverulent coating agent according to claim 1, characterised in that component (A) consists of a copolymer formed of a. 12 to 16 per cent by weight of glycidyl methacrylate, b. 14 to 18 per cent by weight of hydroxyethyl methacrylate, c. 34 to 44 per cent by weight of methyl methacrylate and d. 30 to 40 per cent by weight of butyl methacrylate.

4. A pulverulent coating agent according to claim 1 wherein the copolymer component (A) contains as ethylenically unsaturated epoxide monomer (a) a compound selected from the group consisting of glycidyl acrylate, glycidyl methacrylate, allyl glycidyl ether, methallyl glycidyl ether, glycidyl crotonate, vinyl glycidyl ether, allyl glycidyl maleate, allyl glycidyl phthalate and butadiene monoxide.

5. A pulverulent coating agent mixture according to claim 1 wherein the copolymer component (A) contains as hydroxy alkyl ester component (b) a compound selected from the group consisting of hydroxyethyl acrylate, hydroxyethyl methacrylate, hydroxypropyl acrylate and hydroxybutyl acrylate.

6. A pulverulent coating agent according to claim 1 wherein the copolymer component (A) contains as component (d) a $C_1$ to $C_8$ -aliphatically saturated monoalcohol ester of acrylic or methacrylic acid selected from the group consisting of methyl acrylate, ethyl acrylate, butyl acrylate, 2-ethylhexyl acrylate, 2 ethylhexylmethacrylate, isobutyl acrylate and butyl methacrylate.

* * * * *